Figure 1:
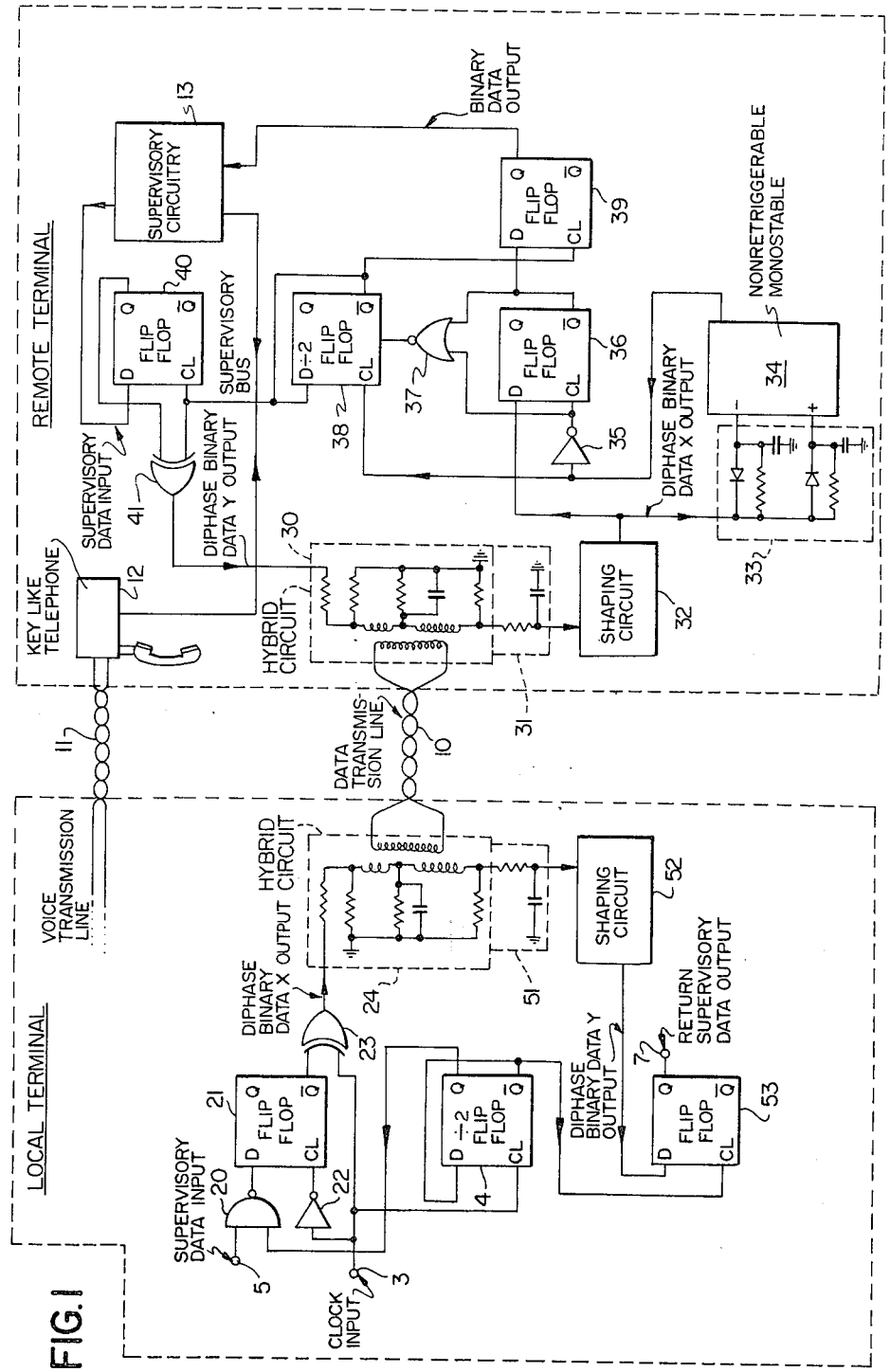

United States Patent [19]
Korver

[11] 3,936,602
[45] Feb. 3, 1976

[54] FULL DUPLEX DATA TRANSMISSION SYSTEM USING TWO SPEEDS OF DIPHASE SIGNAL FOR SIMPLIFIED SYNC

[75] Inventor: Klaas Korver, Ottawa, Canada

[73] Assignee: Northern Electric Company Limited, Montreal, Canada

[22] Filed: Oct. 23, 1974

[21] Appl. No.: 517,218

[52] U.S. Cl. .......................... 178/58 R; 179/15 BS
[51] Int. Cl.² .......................................... H04J 3/06
[58] Field of Search............... 178/58 R, 59, 60, 58; 179/15 BS, 15 BY, 15 BC, 41 A, 170 D; 325/38 R

[56] References Cited
UNITED STATES PATENTS
| | | | |
|---|---|---|---|
| 3,519,743 | 7/1970 | Herzer | 178/58 |
| 3,618,025 | 11/1971 | Tomozawa | 178/58 |

Primary Examiner—Kathleen H. Claffy
Assistant Examiner—E. S. kemeny
Attorney, Agent, or Firm—J. E. Mowle

[57] ABSTRACT

In a telephone system supervision is provided for, between a local terminal typically associated with a telephone switching facility and a remote key telephone terminal. A data link between the terminals includes a two wire transmission line terminated with hybrid circuitry. The hybrids provide full duplex operation. Electronic circuitry, in the local and remote terminals, operates to provide continuous two way transmission of supervisory data by means of diphase signals. A coded diphase signal transmitted from the local terminal has a baud rate twice that of the conventional diphase signal transmitted back from the remote terminal. This allows simple receiver sync extraction circuitry in both the remote and local terminals. The length of transmission line permissible between terminals is limited by a maximum permissible one way delay of half the period of the maximum baud rate.

4 Claims, 17 Drawing Figures

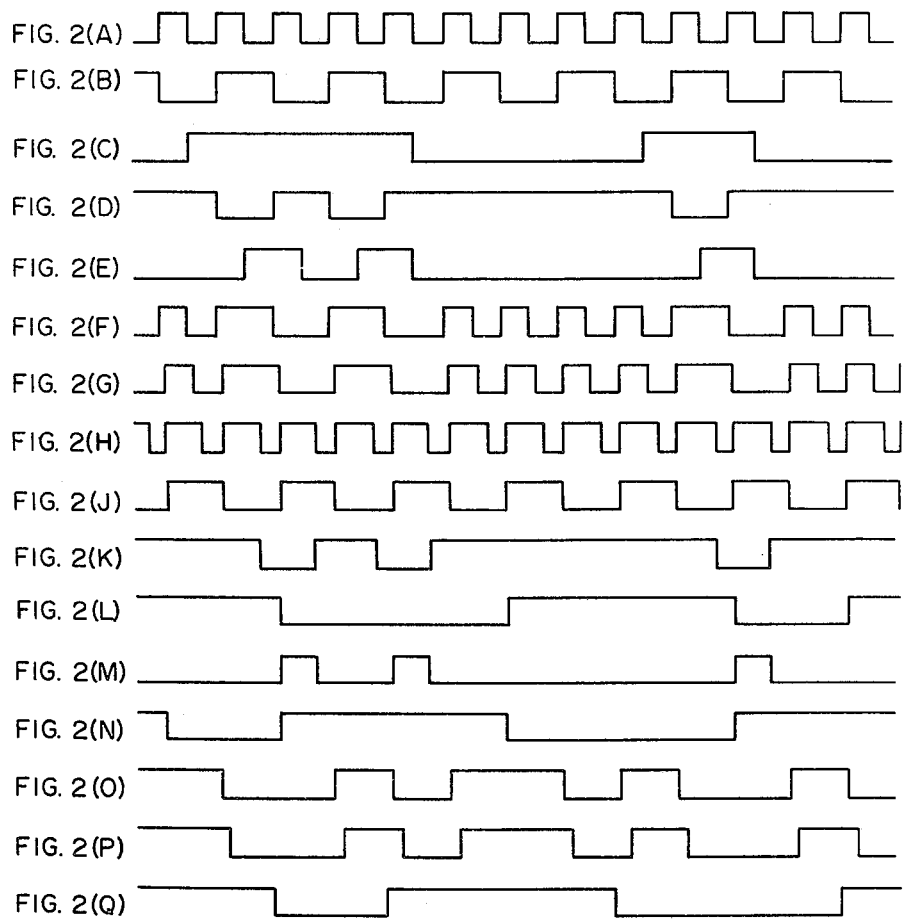

FULL DUPLEX DATA TRANSMISSION SYSTEM USING TWO SPEEDS OF DIPHASE SIGNAL FOR SIMPLIFIED SYNC

The present invention relates to data transmission between a local terminal and a remote telephone terminal, and more particularly to an apparatus and method utilizing clock pulses supplied at the local terminal to provide timing for continuous two-way data transmission by means of a two wire transmission line.

In the telephony art there are various types of telephone systems commonly known as private business exchanges (PBX) which use analogue and/or digital techniques to facilitate the required telephone service. Telephone subscriber sets used in such systems are often of the so called key telephone type. As is well known a key telephone provides for the choice of use of any of a number of telephone lines connected thereto. Of course this optional choice of lines also requires additional supervisory functions, such as for example BUSY, CALLING and HOLD indications. Further leads in addition to the basic telephone lines were required to provide for some of these additional supervisory functions. Consequently, in key telephone systems a key telephone typically is physically connected to the PBX switching facility by means of a bundle of telephone lines and supervisory leads. The more telephone lines and supervisory features provided, the greater the bulk of the bundle becomes.

Typically, key telephone systems are associated with commercial and business establishments. In such environments the actual locations of individuals tends to be somewhat fluid. Hence the telecommunication services required by individuals is also required to move with them. For example, some statistics show that in North America a key telephone is involved with an alteration of service on an average of about once every one and one half years. Accordingly the bundle of leads associated with a key telephone set is likewise often disconnected from and reconnected with the PBX switching equipment. This provides an opportunity for errors to occur, at least in proportion to the numbers of leads involved and adds considerable expense to providing and maintaining the required business telephone services.

In some recent and more sophisticated systems of the time division multiplex (TDM) PBX types, a plurality of key like telephones are connected to a single telephone line, often a coaxial cable, with communication and supervision being provided on a time slot allocation basis. The circuitry of each individual telephone is of course far more complex than that of the typical key telephone, however the copper wire saving, ease of installation and alteration, and the additional flexibility of service make this system attractive. A major disadvantage in this system is that if the cable is cut or otherwise disconnected, all the telephones serviced by the cable become inoperative.

In yet another type of system, each telephone or key telephone is serviced by only a singular voice path telephone line, as usually in reality at one telephone only one coversation at a time occurs. The singular voice path is switched in the switching equipment to assume the identity of any one of a particular group of lines represented by buttons on the telephone set. Supervision, to provide for example the activity states of the telephone numbers associated with the key telephone, is provided over a four wire supervision link. Two of the wires are used to transmit supervisory information to the telephone set and the remaining two wires are used to receive supervisory information from the telephone set. This type of system provides significant copper, installation and alteration cost savings.

SUMMARY OF THE INVENTION

The present invention provides a supervisory apparatus and a method of supervision for key-like telephone subsets. A subset is connected to a common control switching exchange via four wires consisting of an analogue voice telephone line and a digital supervisory line. The telephone line proves a typical voice link between the telephone switching equipment and the remote key-like telephone subset. The supervisory line provides for an exchange of supervisory information between the telephone switching equipment and the remote key-like telephone subset, on a continuous basis. The simplicity of this interconnection provides reduction in the cost of copper, installation and relocation, as compared with the more typical business telephone systems. Also the total outage vulnerability of PBX, TDM loop systems is avoided.

The present invention is a method for exchanging data between local and remote terminals, via a two wire transmission line. The method comprises the steps of, transmitting, a coded diphase signal from the local terminal. The coded diphase signal includes first and second portions, respectively representing data bits of first and second states. The first portion contains two transitions per data bit and the second portion contains four transitions per data bit. The coded diphase signal is received in the remote terminal, and first signals, at the baud rate of and synchronized with the coded diphase signal, are generated. Second signals at half the baud rate and in phase with the first portion are also generated. The received coded diphase signal is decoded in synchronism with the first and second signals to derive the data bits. A conventional diphase signal, having half the baud rate of the coded diphase signal, synchronized with the second signal and representing other data bits, is transmitted. The diphase signal is received, in the local terminal, delayed by less than half the period of the baud rate of the coded diphase signal and is decoded in synchronism with a signal in phase with the first portion, to derive the other data bits. In general, the transmission of digital information requires either the separate transmission of a clocking signal or sufficient information within the signal itself to enable a clock to be recovered so that the digital information can be extracted at the far terminal. In the transmission of coded diphase signals a simple clock recovery can be achieved utilizing a non-triggerable monostable. In the present application this is the arrangement used for recovering the clock from the signal transmitted from the local terminal to the remote terminal. However this arrangement results in an asymmetrical clock which cannot be readily used for clocking the return signals.

By doubling the clock rate of the coded diphase signal and limiting the length of the transmission path, as the applicant has discovered, the clocking signals from the local terminal can be easily recovered and, after dividing by two to achieve symmetry, used to synchronize the diphase information being transmitted from the remote terminal. This diphase information can then be directly extracted at the diphase rate using the original clock, without the need for providing locally generated clock extraction and synchronization information.

The present invention is also an apparatus for exchanging data between a local terminal and a remote terminal, via a two wire transmission line, terminated with hybrid circuit means. The apparatus comprises, in the local terminal, means for transmitting a coded diphase signal via the hybrid circuit means and the transmission line, the coded diphase signal having first and second portions, respectively representing data bits of first and second states, the first portion having two transitions per data bit and the second portion having four transitions per data bit. In the remote terminal, a receiving means receives the coded diphase signal. A generating means generates first signals at the baud rate of and synchronized with the coded diphase signal and generates second signals at half of the baud rate and in phase with the first portion. A decoding means, decodes the coded diphase signal in synchronism with the first and second signals to derive the data bits. A diphase signal transmitting means synchronized with the second signal, transmits a diphase signal, at half the baud rate of the coded diphase signal and representing other data bits via the hybrid circuit means and the transmission line. In the local terminal, a receiving means receives the diphase signal, delayed in transmission by less than half the period of the coded diphase signal. A decoding means is synchronized with a signal in phase with the first portion and derives the other binary data.

An example embodiment of an apparatus for exchanging supervisory data between local and remote terminals is described in the following, with reference to the accompanying drawings in which:

FIG. 1 is a block schematic illustration of an apparatus incorporating the invention; and FIGS. 2(A) – 2(Q) are graphical representations of wave forms, observable at various points in the apparatus of FIG. 1, during its operation.

In FIG. 1, a local terminal and a remote telephone terminal are connected together by a twisted pair data transmission line 10 and a twisted pair analogue voice transmission line 11. Typically the local terminal is one of a group of local terminals residing together in association with a switching facility. Alternately, the local terminal may be located remote from the switching facility and connected thereto by some convenient means, for example a time division multiplex loop and appropriate interface circuitry.

In the remote telephone terminal, the transmission line 11 terminates at voice circuitry (not shown) in a key-like telephone subset 12. The subset 12 includes various buttons and lights (not shown) which are interconnected with supervisory circuitry 13.

In the local terminal, supervisory data from the switching facility is applied at terminal 5. Clock pulses are applied at terminal 3 and a divide by two flip flop 4 connected at the clock terminal 3 provides half rate clock pulses at its outputs Q and $\bar{Q}$.

In the following, the circuit structure will become apparent in the description of the operations of the apparatus in FIG. 1 with reference to the wave forms in FIG. 2. Each of the circuit elements identified as a flip flop includes a data input D, a clock input CL and complementary outputs Q and $\bar{Q}$. In operation, the output Q assumes the state of the input D when the input CL is subjected to a positive going edge. Also in the following the term "diphase signal" is taken to mean an encoded signal which is of an average d.c. value midway between the extreme opposite excursions of the signal wave form. The term "diphase binary signal" is taken to be a diphase signal as it would be typically derived from digital circuitry working between a d.c. voltage power supply and ground. The diphase binary signal accordingly at any instant assumes one of two states, that is substantially ground or substantially the d.c. power supply voltage.

The clock pulses applied to the clock pulse terminal 3, illustrated in FIG. 2(A), as before mentioned are divided by the flip flop 4 and appear at the output Q thereof as illustrated in FIG. 2(B). The clock pulses in FIG. 2(A) have a period of about 210 microseconds and in FIG. 2(B) have a period of about 420 microseconds. Supervisory binary data for example as illustrated in FIG. 2(C) from the switching facility is applied at an input of a NAND gate 20. The half rate clock pulses FIG. 2(B) are applied to another input of the NAND gate 20, providing at the output thereof a signal corresponding to FIG. 2(D) which is applied to the input D of a flip flop 21. The clock pulses in FIG. 2(A) are inverted by an inverting amplifier 22 and applied to the input CL of the flip flop 21. The resulting signal appears at the output $\bar{Q}$ of the flip flop 21 and is the signal in FIG. 2(D), however inverted and delayed by half the period of the clock pulse rate, i.e. 105 microseconds as illustrated in FIG. 2(E). This signal is applied to an input of an exclusive OR gate 23, along with the clock pulses applied at another input thereof. The resultant of the exclusive ORing operation, produces a coded diphase binary data X signal, as illustrated in FIG. 2(F). It will be noted from comparing FIGS. 2(C) and 2(F) that the coded diphase signal has a baud rate of twice the required to carry the binary data bit rate. Those portions of the signal representing the low portions of the binary data in FIG. 2(C), correspond to the clock pulses in FIG. 2(A) and have twice the baud rate of those portions which represent the high portion of the data in FIG. 2(C) and correspond with the half rate clock signals from the flip flop 4 (FIG. 2(B)).

Hybrid circuit 24, in the local terminal, and 30 in the remote telephone terminal are well known. The coded diphase binary signal from the output of the exclusive OR gate 23, is connected to the input port of the hybrid circuit 24 and hence appears on the transmission line 10 as a diphase signal with no direct current component. The coded diphase signal from the hybrid circuit 24 is received at the transmission line port of the hybrid 30 and directed to the output port thereof in a well known manner. The coded diphase signal passes through a low pass filter 31 and is squared up and provided with a d.c. component by a shaping circuit 32. The wave form of the signal at the output of the shaping circuit, resembles that illustrated in FIG. 2(G) and is slightly delayed with respect to the wave form at the output of the exclusive OR gate 23. The maximum transmission delay permissible is less than half the period of the clock rate. The coded diphase binary signal from the shaping circuit 32 is connected to the negative (−) and positive (+) inputs of a non-retriggerable monostable circuit 34 via a steering circuit 33. The timing period of the monostable circuit 34 is more than half the period of the clock rate but less than the whole of said period. The signal at the output of the monostable circuit 34 resembles that illustrated in FIG. 2(H). The repetition rate is the same as that of the clock signal (FIG. 2(A)), however as it is regenerated from the received diphase signal it is likewise delayed.

The regenerated signal from the output of the monostable circuit 34 is applied to the CL input of a flip flop 36 via an inverting amplifier 35. The coded diphase signal from the shaping circuit 32 is also connected to the input D of the flip flop 36. The flip flop 36 provides at its output $\overline{Q}$ a partially decoded signal, for example as illustrated in FIG. 2(K). The signal at this point has been partially decoded.

An OR gate 37 and a flip flop 38 provide half rate clock signals in phase with the lower baud rate portion of the coded diphase signal. The regenerated clock pulse signals from the output of the monostable circuit 34 are connected to the input CL of the flip flop 38, where these signals are divided to provide half rate clock signals as illustrated in FIG. 2(J). The output $\overline{Q}$ of the flip flop 36 is ORed with the output of the inverting amplifier 35 to provide a reset signal, for example as illustrated in FIG. 2(M). The reset signal is connected to a reset input R of the flip flop 38, and functions to reset the flip flop 38 in the event it should be out of phase with the slower baud rate portion of the coded diphase signal, as could occur through a power interruption.

The partially decoded signal from the flip flop 36 is applied to the input D of a flip flop 39, where it is completely decoded in synchronism with the half rate clock signals from the flip flop 38, applied at the input CL. This provides the binary data at the output $\overline{Q}$ of the flip flop 39 (FIG. 2(L)), for utilization by the supervisory circuit 13.

The supervisory circuitry 13 in addition to receiving continuous supervisory data, also generates supervisory data for utilization by the associated switching facility. The generated supervisory data is applied in binary form to the input D of a flip flop 40 while regenerated half rate clock signals from the flip flop 38 (FIG. 2(J)) are applied to the input CL of the flip flop 40. The resulting output signal from the output Q of the flip flop 40, as exemplified in FIG. 2(N) is exclusively ORed with the regenerated half rate clock signals, by an exclusive OR gate 41, to provide a diphase binary data signal at the slower baud rate, as for example illustrated in FIG. 2(0). This diphase signal is transmitted via the hybrid 30, the transmission line 10, the hybrid 24 and a low pass filter 51 to a shaping circuit 52. The shaping circuit 52 restores a d. c. level to the signal and further squares the signal up to provide a signal for example resembling the wave form in FIG. 2(P), diphase binary data Y. This signal is applied to the input D of a flip flop 53, and is decoded in synchronism with the half rate clock signals applied to the input CL, from the flip flop 4 to provide the supervisory information (FIG. 2(Q)) at a terminal 7.

The low pass filters between the output ports of the respective hybrid circuits and shaping circuits provide isolation from spikes caused by the sharp edges of the signals applied to the input port and tend to be transferred across the typical telephone hybrid circuit.

In the above description it is shown that continuous two-way data transmission is achieved, by the apparatus, over a two-wire transmission line terminated at hybrid circuits. Clock signals are utilized in the local terminal in the generation of a first transmission signal, which is utilized for both data and timing information in the remote telephone terminal. Hence the remote telephone terminal is in delayed synchronism with the clock signals at the local terminal. Signals received from the remote terminal, are decoded using original clock information in the local terminal to derive the return supervision data, providing that the synchronization of these signals is delayed in the round trip by less than a full period of the original clock rate.

The requirement that the round trip delay by way of the transmission line is less than a certain amount places a definite limit on the length of the transmission line utilized in any particular system. In a system having a maximum baud rate of for example about 4.8 kilo bits per second, and utilizing typical indoor copper conductor twisted pair telephone lines, the maximum useful distance between the local terminal and the remote telephone terminal varies primarily with wire size, as illustrated in the following table:

| American Wire Gauge | Useful Distance in Feet |
| --- | --- |
| 26 | 4,500 |
| 24 | 5,300 |
| 22 | 6.300 |

It has been found that if the capacitance between the conductors is reduced, as for example in the case of substituting typical outdoor telephone lines, the useful distance is significantly increased. Of course if the baud rate is decreased, the maximum useful distance is also correspondingly increased.

The hybrid circuits, in this example, were nothing more than typical voice path telephone hybrid transformers. To prevent significant noise transfer through the hybrid transformer simple resistive capacitive filters (31 and 51) are used.

What is claimed is:

1. A method for exchanging data between local and remote terminals, via a two wire transmission line, the method comprising the steps of:
    a. in the local terminal, transmitting a coded diphase signal having first and second portions, respectively representing data bits of first and second states, the first portions having two transitions per data bit and the second portion having four transitions per data bit; and
    b. in the remote terminal, receiving the coded diphase signal,
    c. generating, from the received coded diphase signal, first signals at the baud rate of the coded diphase signal and synchronized therewith and second signals at half of said baud rate and in phase with said first portions,
    d. decoding the received coded diphase signal in synchronism with the first and second signals, to derive the data bits,
    e. transmitting a diphase signal, at half the baud rate of the coded diphase signal, synchronized with said second signal and representing other data bits; and
    f. in the local terminal receiving the diphase signal delayed by less than half the period of the baud rate of the coded diphase signal,
    g. decoding the diphase signal in synchronism with a signal in phase with said first portions, to derive the other data bits.

2. An apparatus for exchanging data between a local terminal and a remote telephone terminal, via a two wire transmission line terminated with hybrid circuit means, the apparatus comprising:
    in the local terminal, means for transmitting, via said hybrid circuit means and said transmission line, a coded diphase signal, having first and second portions, respectively representing data bits of first and second states, the first portion having two transitions per data bit and the second portion having four transitions per data bit; and in the remote terminal, means for receiving the coded diphase signal, means, responsive to the received coded diphase signal, for generating first signals at the baud rate of the coded diphase signal and synchronized therewith, and for generating second signals at half of said baud rate and in phase with said first portions, means for decoding the received coded diphase signal in synchronism with the first and second signals, to derive the data bits, means for transmitting, via said hybrid circuit means and said two wire transmission line, a diphase signal, at half the baud rate of the coded diphase signal, synchronized with said second signal and representing other data bits; and in the local terminal, means for receiving said diphase signal, delayed by less than half the baud rate of the coded diphase signal, means, synchronized with a signal in phase with said first portion in the local terminal, for decoding the diphase signal to derive the other data bits.

3. A method for exchanging data between a local terminal and a remote telephone terminal, the local and remote terminals each coupled via hybrid circuit means to a two wire transmission line, the local terminal also coupled to a first source of clock pulses and second source of clock pulses occurring at half the rate and synchronized with the first source of clock pulses, the method comprising the steps of:

a. in the local terminal, generating a coded diphase binary signal, in which the bits of the diphase binary signal representing first binary data bits, from the local terminal, of one of two states, correspond to the first clock pulses and the bits of the diphase binary signal representing the first binary data bits, from the local terminal, of the other of the two states, correspond to the second clock pulses, and applying the first diphase binary signal to one of the hybrid circuit means to facilitate transmission of a coded diphase signal over the transmission line, b. in the remote telephone terminal, receiving the coded diphase signal from the other hybrid circuit means delayed by less than half the period of the rate of the first clock pulse signals, in transmission from the local terminal, and regenerating the coded diphase binary signal therefrom, c. regenerating clock pulse signals from the signal regenerated in step (b), d. generating half rate clock pulse signals in response to the regenerated clock pulse signals and in synchronism with the bits of the signal regenerated in step (b) which represent said other of the two states, e. decoding the signal regenerated in step (b), in synchronism with the regenerated clock pulse signals and the generated half rate clock pulse signals to derive the first binary data bits, f. generating a diphase binary signal representing second binary data bits, in synchronism with the generated half rate clock pulse signals and applying the diphase binary signal to the other of the hybrid circuit means to facilitate transmission of a diphase signal over the transmission line; and g. in the local terminal, receiving the diphase signal from the one hybrid circuit means delayed by less than half the period of the rate of the first clock pulses, in transmission from the remote telephone terminal, and regenerating therefrom a diphase binary signal, h. decoding the diphase binary signal in synchronism with the second clock pulse signals, to derive the second binary data bits.

4. An apparatus, for facilitating an exchange of data between a local terminal and a remote telephone terminal via a two wire transmission line, in the local terminal the apparatus comprising:

means, responsive to first clock pulses and second clock pulses occurring at half the rate of the first clock pulses and synchronized therewith, for generating a coded diphase binary signal, in which bits of the coded diphase binary signal representing first binary data bits of one of two states, from the local terminal, correspond to the first clock pulses and bits of the coded diphase binary signal representing the first binary data bits of the other of the two states correspond to the second clock pulses;

first hybrid circuit means having an output port, an input port for the application of the coded diphase binary signal thereto, and a transmission line port connected to the transmission line, for the transmission of coded diphase signals and for the reception of diphase signals;

means, responsive to the second clock signals, for decoding the second diphase signals appearing at the output port of the first hybrid circuit means and delayed in transmission from the remote telephone terminal by less than half the period of the rate of said first clock pulses, to derive second binary data bits therefrom; and in the remote telephone terminal the apparatus comprising:

means, responsive to binary data bits in the remote telephone terminal and to regenerated half rate clock pulse signals, for generating a diphase binary signal;

second hybrid circuit means having an output port, an input port for the application of the diphase binary signals thereto, and a transmission line port, for the transmission of the diphase signals and the reception of the coded diphase signals;

means, responsive to the coded diphase signals, appearing at the output port of the second hybrid circuit means, for regenerating clock pulses;

means, responsive to the regenerated clock pulse signals and to the coded diphase signal, delayed in transmission by less than half the period of the rate of the first clock pulse signals, for regenerating the half rate clock pulse signals;

means, responsive to the regenerated clock pulse signals, and the regenerated half rate clock pulse signals, for decoding the first diphase signal, appearing at the output port of the second hybrid circuit means, to derive the first binary data bits therefrom.

* * * * *

UNITED STATES PATENT AND TRADEMARK OFFICE
CERTIFICATE OF CORRECTION

PATENT NO. : 3,936,602
DATED : 3 February, 1976.
INVENTOR(S) : Klaas KORVER

It is certified that error appears in the above-identified patent and that said Letters Patent are hereby corrected as shown below:

Column 7, line 43, delete "first" and insert --coded--;

Column 8, line 34, delete "signals" and insert --pulses--;

Column 8, line 35, delete "second";

Column 8, line 61, delete "first" and insert --coded--.

Signed and Sealed this

Twenty-first Day of September 1976

[SEAL]

Attest:

RUTH C. MASON
Attesting Officer

C. MARSHALL DANN
Commissioner of Patents and Trademarks